United States Patent
Van De Meulenhof et al.

(10) Patent No.: US 6,725,285 B2
(45) Date of Patent: Apr. 20, 2004

(54) COMMUNICATION SYSTEM, CONTROLLING DEVICE AND CONTROLLED DEVICE

(75) Inventors: Dennis Van De Meulenhof, Eindhoven (NL); Eduard Gerhard Zondag, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 386 days.

(21) Appl. No.: 09/822,392

(22) Filed: Mar. 30, 2001

(65) Prior Publication Data

US 2001/0027498 A1 Oct. 4, 2001

(30) Foreign Application Priority Data

Apr. 4, 2000 (EP) .......................................... 00201212

(51) Int. Cl.[7] .............................................. G06F 3/00
(52) U.S. Cl. .............................. 710/8; 710/18; 710/29; 710/31; 712/225; 709/223
(58) Field of Search ................................. 710/8, 11, 12, 710/29, 31, 36, 40, 62, 72, 7, 15, 18; 712/225, 245; 713/1; 709/208, 223, 269

(56) References Cited

U.S. PATENT DOCUMENTS

| | | | | |
|---|---|---|---|---|
| 5,959,536 A | * | 9/1999 | Chambers | 340/636 |
| 6,032,202 A | * | 2/2000 | Lea et al. | 710/8 |
| 6,052,750 A | * | 4/2000 | Lea | 710/72 |
| 6,199,136 B1 | * | 3/2001 | Shteyn | 710/129 |
| 6,237,049 B1 | * | 5/2001 | Ludtke | 710/8 |
| 6,286,071 B1 | * | 9/2001 | Iijima | 710/124 |
| 6,546,419 B1 | * | 4/2003 | Humpleman et al. | 709/223 |

FOREIGN PATENT DOCUMENTS

WO    WO9935787    12/1998    .......... H04L/12/00

OTHER PUBLICATIONS

T.F.La Porte et al, "Experinces with Network–Based User Agents for Mobile Applications",Mobile Networks and Applications 3, Aug. 1998, pp. 123–141,XP002172566.

A.Montvay, "System Management and Automatic Reconfiguration Algorithms for IHDN" System Management and Automatic Reconfiguration Algorithms for IHDN, 'Online, 1999 XP002172567.

K. Maeda, "Development of Soccer Agents with Objrct Migration", IEEE SMC'99 Conference Proceedings, Oct. 1999, pp. 750–755, XP002172568.

* cited by examiner

*Primary Examiner*—Fritz Fleming
*Assistant Examiner*—Rijue Mai

(57) ABSTRACT

A communication system having a controlled device (105), for which an abstract representation (AR) (107) is provided as interface on a controlling device (103). When the quality of the connection between the controlling device (103) and the controlled device (105) drops below a predetermined level, or if some similar criterion is met, the system selects a second controlling device (104) which is better suited for controlling the controlled device (105) and generates a migration event to indicate this. The first controlling device (103) transfers control over the controlled device (106) to the second controlling device when it receives said migration event. This can be done by uploading the AR (107) to the second controlling device (105), possibly supplemented with the current state of the AR (107) to perform a fully transparent transfer.

13 Claims, 1 Drawing Sheet

COMMUNICATION SYSTEM, CONTROLLING DEVICE AND CONTROLLED DEVICE

BACKGROUND AND SUMMARY

1. Technical Field

The invention relates to a communication system including a plurality of interconnected controlling devices and a controlled device, functionality of the controlled device being associated with an abstract representation, referred to as AR, which provides an interface for controlling the controlled device, the AR for the controlled device being installed on a first controlling device from said plurality.

The invention further relates to a controlling device for use in a communication system including a plurality of interconnected controlling devices and a controlled device, functionality of the controlled device being associated with an abstract representation, referred to as AR, which provides an interface for controlling the controlled device, the AR for the controlled device being installed on another controlling device from said plurality.

The invention further relates to a controlled device for use in a communication system including a plurality of interconnected controlling devices and said controlled device, functionality of the controlled device being associated with an abstract representation, referred to as AR, which provides an interface for controlling the controlled device, the AR for the controlled device being installed on another controlling device from said plurality.

2. Description

A typical home audiovisual system includes a number of devices, e.g. a radio receiver, a tuner/decoder, a CD player, a pair of speakers, a television, a VCR, a tape deck, and so on. These devices are usually interconnected to allow one device, e.g. the television, to control another, e.g. the VCR. One device, such as e.g. the tuner/decoder, is usually the central device, providing central control over the others. Control buttons and switches are usually located on the front of the tuner as well as on a handheld remote control unit. A user can control all devices by means of the central device or the remote control unit.

As these devices have become more versatile and more complex, simple manual control is no longer sufficient. Furthermore, as more and more devices become available, interoperability starts to become a problem. Many vendors use their own communication protocols to allow their devices to interact, but devices from different vendors cannot interact. To overcome these problems, several interoperability standards have been defined, which allow different devices to exchange messages and information and to control each other. One well-known standard is the Home Audio/Video Interoperability (HAVi) standard, version 1.0 of which was published in January 2000, and which is available on the Internet at the address http://www.havi.org/. Another well-known standard is the domestic digital bus (D2B) standard, a communications protocol described in IEC 1030.

In a system according to such a standard, devices are interconnected in a network using a standard bus, e.g. an IEEE 1394 serial communication bus, and exchange information, such as messages, data and commands, over this network according to the standard. Standards such as HAVi define the protocol for such exchanges, allowing devices from different vendors to interact. Users can add new devices to the network, and they immediately become available to other devices. The protocol for "discovering" such a new device is also standardized.

A device can act as a controlling device, thereby controlling another device, called the controlled device. For example, a tuner/decoder may control an amplifier or speakers. This type of control is typically done in a vendor-specific fashion, as it requires access to the internal hardware of the controlled devices. To allow arbitrary devices to interact with another device, standards such as HAVi or D2B define the concept of an abstract representation (AR), which provides an interface to the functionality of a controlled device. Application devices wishing to interact with a controlled device can now interact with the AR, installed on a controlling device, rather than directly with the controlled device itself. The controlling device then translates the information received from said application device into instructions, possibly in a proprietary fashion, which are sent to the controlled device. Any feedback from the controlled device is translated back and sent to the application device.

There may be more than one controlling device in the network capable of controlling one controlled device. For example, a wireless phone can consist of a handset and several base stations available in the network. Each base station, being a controlling device, is capable of controlling the handset, which is the controlled device in this example. When the user is making a call, he may move outside the range of the first base station and into the range of the second base station. It would then be advantageous if the second base station could take over control over the wireless phone, so that the user can continue his call. Other wireless devices may be in similar situations when they are moved around. A handheld remote control unit, used to send commands devices in the network, in particular is moved around very frequently and may need a different controlling device to receive the commands for further transmission in every room. Devices connected to the network with a wire may also be moved from one location to another, for example when a user takes a portable TV from the living room to the kitchen. In the present situation, when this device is connected in the second location, a new controlling device needs to be selected which will control the controlled device. The new controlling device must then install an abstract representation (AR) for the controlled device, after which other devices can access the functionality of the controlled device. However, from a user's perspective, the controlled device has now returned to its initial state, and has forgotten the settings the user made, such as the song currently being played or which options were selected on an amplifier.

In addition, when the controlled device is disconnected, all interactions with other devices are ended. After the controlled device has been connected again on the new location, these devices can again interact with it, but they will have lost their current state of the interaction as well.

It is an object of the invention to provide a communication system according to the preamble, in which control over a controlled device can be transferred to another controlling device in a transparent and automated fashion.

This object is achieved according to the invention in a communication system that is characterized in that the system has migration means for selecting a second controlling device from said plurality based on a predetermined criterion and for generating a migration event, and in that the first controlling device is arranged to transfer control over the controlled device to the second controlling device in response to the migration event. In systems according to standards such as HAVi, devices communicate using messages and events, and it is possible to define new events, such as migration events, not defined in the standard. By receiving a migration event, preferably containing an identifier for the second controlling device, the first controlling device can find out to which device control should be transferred. Since it may be possible that more than one device is capable of receiving the transferred control, the system must select one such capable device first.

In an embodiment the predetermined criterion comprises a level for the quality of a connection between the controlled device and any of the controlling devices from said plurality. When using this criterion, a transfer can be initiated when the second controlling device is found to have a higher quality connection than the first controlling device. An advantage of this embodiment is that the quality of the connection is easy to measure, and techniques to do this are well known, e.g. from mobile phone technology.

In a further embodiment the predetermined criterion comprises a level for the availability of resources on the controlling devices from said plurality. When using this criterion, a transfer can be initiated when the second controlling device is found to have more resources available than the first controlling device, or when the first controlling device is found to have too few resources available to continue controlling the controlled device. An advantage of this embodiment is that it allows for a better distribution of used resources over the available devices. A further advantage is that the first controlling device can now transfer control when it becomes too busy.

In a further embodiment the first controlling device is arranged to transfer control by transferring the AR for the controlled device to the second controlling device. An advantage of this embodiment is that this requires no special functionality in the second controlling device, as uploading of ARs to controlling devices is well known in systems such as HAVi. In this embodiment, the first controlling device simply uploads the AR to the second controlling device.

In a further embodiment the first controlling device is arranged to additionally transfer the current state of the AR to the second controlling device. An advantage of this embodiment is that the settings and selections made by the user will now still be set and selected after the transfer, thereby increasing the transparency of the transfer. This can be achieved by uploading the AR together with data associated with the AR to the second device.

In a further embodiment the second controlling device is arranged to receive the transferred control by creating an interface to the AR which interfaces with the AR on the first controlling device. An advantage of this embodiment is that the state of the AR is not modified, as the AR stays in place on the first controlling device. Other devices interacting with the AR can still do so. The first controlling device now acts as a proxy, exchanging messages with the second controlling device.

In a further embodiment the first controlling device is located in a first cluster comprising devices from said plurality and the second controlling device is located in a second cluster comprising devices from said plurality, said first and second clusters being interconnected via respective gateway devices. An advantage of this embodiment is that the transfer of control is now also possible when the first and second controlling devices are not in the same cluster. The migration event may need to be transferred via the respective gateway devices from the second to the first cluster.

It is a further object of the invention to provide a controlling device according to the preamble, which can transfer control over a controlled device to another controlling device in a transparent and automated fashion.

This object is achieved according to the invention in a controlling device that is characterized in that the controlling device is arranged to transfer control over the controlled device to another controlling device in response to the migration event.

In an embodiment the controlling device is arranged to transfer control by transferring the AR for the controlled device to the other controlling device.

In a further embodiment the controlling device is arranged to additionally transfer the current state of the AR to the other controlling device.

It is a further object of the invention to provide a controlling device according to the preamble, which can receive control over a controlled device transferred from another controlling device in a transparent and automated fashion.

This object is achieved according to the invention in a controlling device that is characterized in that the controlling device is arranged to receive control over the controlled device transferred from the other controlling device by creating an interface to the AR which interfaces with the AR on the other controlling device.

It is a further object of the invention to provide a controlling device according to the preamble, which can initiate the transfer of control over a controlled device to another controlling device in a transparent and automated fashion.

This object is achieved according to the invention in a controlling device that is characterized in that the controlling device has migration means for selecting another controlling device from said plurality based on a predetermined criterion and generating a migration event. The reception of said migration event initiates the transfer of control.

It is a further object of the invention to provide a controlled device whose control can be transferred from one controlling device to another controlling device in a transparent and automated fashion.

This object is achieved according to the invention in a controlled device that is characterized in that the controlled device has migration means for selecting another controlling device from said plurality based on a predetermined criterion and generating a migration event. The controlling device currently controlling the controlled device will then automatically transfer control over the controlled device to the other controlling device, in response to said migration event.

BRIEF DESCRIPTION OF THE DRAWINGS

These and other aspects of the invention will be apparent from and elucidated with reference to the embodiments shown in the drawing, in which.

DETAILED DESCRIPTION

Figure 1:
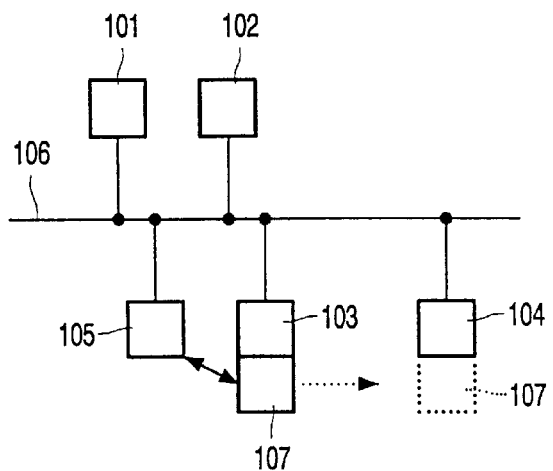
FIG. 1 is a block diagram of a system including a plurality of controlling devices and a controlled device according to the invention.

Throughout the figures, same reference numerals indicate similar or corresponding features. Some of the features indicated in the drawings are typically implemented in software, and as such represent software entities, such as software modules or objects.

FIG. 1 is a block diagram of a communication system including a plurality of controlling devices 101, 102, 103,

104 and a controlled device 105. These devices are interconnected via a communication network 106, for instance based on IEEE 1394, using the same higher-level communication protocols. The functionality of the controlled device 105 is made available through an interface 107, called an abstract representation (AR). This interface is installed on a first controlling device 103 from said plurality. The interface is made available via the API (Application Program Interface) of this AR. This API is the access point for applications to control the controlled device 105. For instance, an intelligent television in the family room might be the controlling device for a number of controlled devices. A controlled device could contain code that constructs a user interface for the controlled device and allows external control of the controlled device. When such a device is first connected, the controlling device, e.g. said intelligent television, obtains the user interface and control code. An icon representing the controlled device may then appear on the television screen, and manipulating the icon may cause elements of the control code to actuate the represented device or devices in prescribed ways. It should be noted that it is possible that the controlled device 105 and the controlling device 103 are realized in one physical device.

While in reality there is a smoother continuum of device capabilities than is acknowledged here, the following categorization is useful in understanding the model of this system. The communication capabilities of the devices in this generic example have different levels of sophistication. Dependent on their communication capabilities, the devices belong to one of the following classes:

Controlling devices:
 A distinction can be made between the following two types of controlling devices:
  Full AV Device (FAV)
   A Full AV device generally has a rich set of resources and is capable of supporting a complex software environment. The primary distinguishing feature of a FAV device is the presence of a runtime environment for executing an abstract representation (AR) for a controlled device. This allows a FAV device to upload an AR from other devices or via other local area or wide area communication networks and to so provide enhanced capabilities for their control. The FAV device may also be able to download applications/features. Preferably, the downloaded code is some form of executable code of a virtual machine, e.g. Java or similar bytecodes. Likely candidates for FAV devices are Set Top Boxes (STB), digital TV receivers (DTV), general-purpose home control devices, and even home PCs.
  Intermediate AV Device (IAV)
   Intermediate AV devices are generally lower in cost than FAV devices and more limited in resources. They do not provide a runtime environment for downloadable ARs and so cannot act as controlling devices for arbitrary devices within the system. However, an IAV device may provide native support for control of particular controlled device (s) in the system.

Controlled devices
 A distinction can be made between the following two types of controlled devices:
  Base AV Device (BAV)
   These are devices that, for business or resource reasons, choose to implement future-proof behavior by providing an uploadable AR, but the devices themselves do not execute an AR. These devices can be controlled by a controlling device, by a FAV device via the uploadable bytecode or by an IAV device via native code. The protocol between the BAV device and its controlling device typically is proprietary. Communication between a controlling device and a BAV device requires that commands for the AR are translated to and from the command protocol used by the BAV device. This translation is performed by the controlling device executing the AR.
  Legacy AV Device (LAV)
   LAV devices are devices that do not comply with the described system architecture and communication protocols. Typically, such devices were built earlier. These devices use proprietary protocols for their control, and usually have simple control-only protocols. Such devices can work in the home network but require that FAV or IAV devices act as a gateway. Communication between a Full or Intermediate AV device and a legacy AV device requires that commands be translated to and from the legacy command protocol.

During the course of interaction, devices may exchange messages, commands and data in a peer-to-peer fashion. This ensures that, at the communication level, no one device is required to act as a master or controller for the system. However, it also allows a logical master or controller to impose a control structure on the basic peer-to-peer communication model.

The AR is a software element used to control a device. An AR may comprise code for the AR itself. It may also comprise code for Functional Component Modules (FCMs) for each functional component within the controlled device. An FCM is a (software) abstraction of a functional component providing the functionality of that functional component to the software environment and applications. Other devices do not communicate with a functional component directly but only through the FCM. An FCM is an object in the sense that it may be registered as a receiver in a registry (details are provided below) and that it can communicate with other objects via a messaging system. A functional component represents functions associated with one identifiable main function of a device. E.g. a VCR AR may comprise separate FCMs for the tape deck and the tuner; a TV AR may comprises separate FCMs for the monitor, PIP (picture in picture display) and tuner. In addition an AR may include a device control application—a software element allowing user control of the device and its functional components.

To allow other devices to locate and access functionality contained in an AR, the system maintains a registry containing identifiers which can be used to locate all devices in the system. Devices can query the registry to find out the devices and functional components available and to get a software element identifier to allow them to interact with the device via the AR and the FCMs.

ARs are handled by a FAV device or IAV device that can install them. Installation of an AR code unit results in the installation of all the associated FCMs. The code can be written in a standard bytecode, in which case they can be installed on all FAV devices, or in some native code, in which case they can be installed only on (and by) some FAV or IAV that knows that code and is prepared for that kind of code.

The controlled device 105 can be a mobile device, for example the handset of a wireless phone or a handheld remote control unit. Such a device needs a base station of some kind acting as a controlling device to send and receive commands. The connection between the base station and the mobile device is typically wireless, for example using DECT technology, 802.11, HIPERLAN, or infrared communication. A network can have more than one base station for one mobile device, for example a receiver for the remote control unit can be located in every room. In that case, it can happen that another base station becomes more suited for controlling the mobile device. The base stations could as a first criterion measure the quality of their connection with the mobile device. If it turns out that another base station has a better quality connection than the base station currently controlling it, control should be transferred to that other base station. Alternatively, the currently controlling base station could measure its own connection and transfer control to another base station when the quality drops below a certain level.

The above also applies for non-mobile devices which are moved around in the network, such as a portable TV or radio which is moved from the living room to the kitchen. A tuner or set-top box may be present in the kitchen as well as in the living room, and plugging in the TV or radio in there then means that control has to be transferred to the controlling device in the kitchen. In that case, the quality of the connection could be measured as the distance between the controlling device and the controlled device, or the presence or absence of a display unit for controlling the controlled device in the room.

Another criterion is the level for the availability of resources on the controlling devices. If the controlling device is becoming too busy, it may transfer control over a controlled device to another device to ensure the user gets a better performance when interacting with that controlled device.

When one of the predetermined criteria such as the ones described above is met, the system selects a controlling device 104 which is better suited for controlling the controlled device 105 according to said criterion, and generates a migration event. This is a special type of message which informs devices on the network 106 that control over a controlled device 105 is to be transferred to another controlling device 104. The migration event message can include a reference to the other controlling device 104, so that all other devices also know where control is going to be moved to. The message could also only be sent to the controlling devices involved, so that they can silently arrange the transfer. The first controlling device 103 can send a message to the devices currently interacting with the AR 107 on the first controlling device 103, informing them of the transfer. This allows them to find out which second controlling device 104 they should interact with from now on.

Depending on the criterion used, there are different devices in the system which are best suited for selecting the second controlling device 104. For instance, when the criterion is the level of the quality of the connection between the controlled device 105 and the available controlling devices, the controlled device 105 can measure the level of the quality of all connections with the available controlling devices and select the second controlling device 104 as the controlling device with the best measured level for the quality. The controlling devices which are able to control the controlled device 105 can communicate with each other to compare quality levels or available resources and select the second controlling device 104 amongst themselves based on said comparison. The first controlling device 103 can detect itself that the quality of its connection with the controlled device 105 dropped between a certain level and contact the other controlling devices to find out which of them would be better suited to transfer control to. In general, it may be useful if the controlling devices which are able to control the controlled device 105 are able to communicate with each other, for example to determine collectively if a predetermined criterion is met, or to locate the controlled device 105 if it is a mobile unit.

The first controlling device 103 transfers control over the controlled device 106 to the second controlling device 104 in response to receiving a migration event. The first controlling device 103 can do this by uploading the AR 107 for the controlled device 105 to the second controlling device 104. Uploading of ARs to controlling devices is well known in systems such as HAVi. The first controlling device 103 can upload its own copy of the AR, or obtain a copy of the AR from the original source, such as the controlled device 105. The first controlling device 103 can additionally transfer the current state of the AR 107 to the second controlling device 104. To do this, the first controlling device 103 also uploads all data associated with the AR to the second device. The settings and selections made by the user will now still be set and selected after the transfer, thereby increasing the transparency of the transfer.

Control can also be transferred to the second controlling device 104 by having the second controlling device 105 create an interface to the AR which interfaces with the AR 107 on the first controlling device 103. In this case, the state of the AR is not modified, as the AR stays in place on the first controlling device 103. Other devices interacting with the AR can still do so. The first controlling device 103 now acts as a proxy, receiving messages, data and commands from the second controlling device 104, passing them on to the controlled device 104 and transferring the results back to the second controlling device 104. This of course only works when the first controlling device 103 can still maintain a connection with the controlled device 105. For example, a handheld remote control unit may move to a second room, where a second controlling device 104 is better suited for receiving signals from it. However, the signals may contain commands intended for another controlled device, which is connected only to the first controlling device 103. The first and second controlling devices 103, 104 now need to work together to allow the remote control unit to send signals with commands to that other controlled device.

Figure 2:
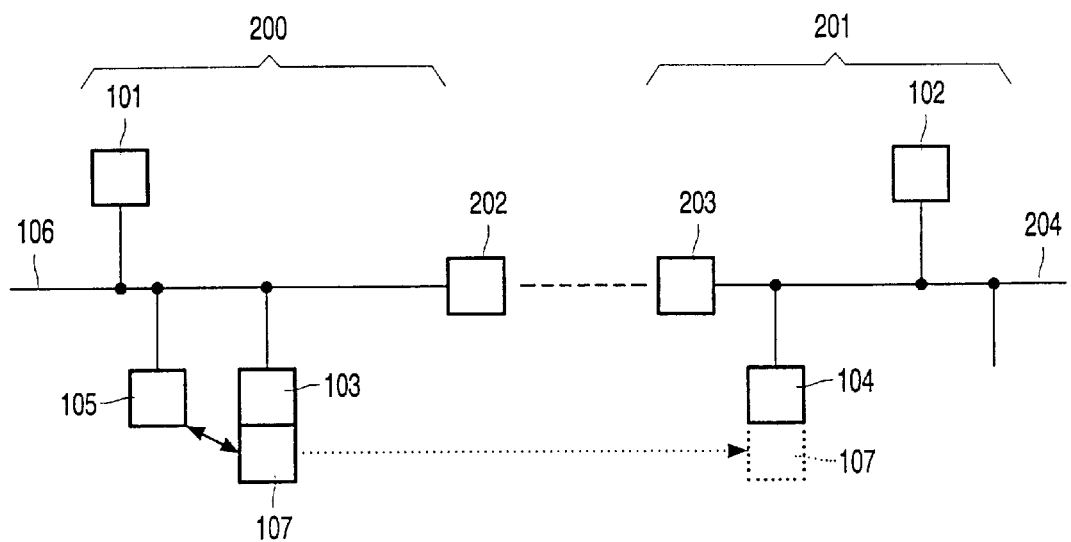
FIG. 2 is a block diagram of a system including multiple clusters of devices according to the invention.

FIG. 2 shows a communication system similar to the communication system of FIG. 1. However, in FIG. 2 the first controlling device 103 is located in a first cluster 200 of devices and the second controlling device 104 is located in a second cluster 201 of devices. The first cluster 200 and the second cluster 201 are themselves interconnected via respective gateway devices 202, 203, where gateway device 202 resides in the first cluster 200 and gateway device 203 in the second cluster 201. There is some kind of communication network 204 between the gateway devices 202, 203, over which messages, commands and data can be sent from one cluster to another. This network can be any type of network, for example a wireless link. It is possible that the first cluster 200 and the second cluster 201 use different communication protocols in their respective communication networks. In that case, the gateway devices 202, 203 must be arranged to translate messages received from the first cluster 200 to the protocol used in the second cluster 201, and vice versa. Such a setup is sometimes referred to as a bridge, formed by the gateway devices 202, 203, between the two clusters.

In the system according to FIG. 1, devices interacting with the AR 107 can, after the transfer, query the registry to find out where the second controlling device 104 is and then start interacting with the AR 107 on the second controlling device 104. If, however, this second controlling device 104 is located in the second cluster 201, as shown in FIG. 2, the registry for the first cluster 200 does not necessarily contain a reference to it.

In a system using a standard such as HAVi, the registry is often restricted to a single cluster, but there are many ways to provide devices in one cluster access to the registry in another cluster. For example, the gateway devices 202, 203 could transfer registry information from their respective clusters 200, 201 to the other cluster, or pass on messages intended for the local registry to the other cluster so that the other registry also gets updated. Alternatively, the gateway device 103 could be arranged to pass on queries for the registry originating in the second cluster 201 to the gateway device 202 in the first cluster 200, where the query can be answered. The results are then transferred back to the second cluster 201. A global registry, accessible in all clusters, could also be provided.

The first controlling device 103 can also send a message to the devices interacting with the AR 107 on the first controlling device 103, informing them of the transfer. This allows them to find out which second controlling device 104 they should interact with from now on, and to find out in which second cluster 201 this controlling device 104 is located.

Control over the controlled device 105 can now be transferred in a fashion similar to the transfer described above with reference to FIG. 1. If the first controlling device 103 wants to transfer control by uploading the AR 107 to the second controlling device 104, then either the gateway devices 202, 203 need to support this type of communication between the two clusters 200, 201, or the controlling devices 103, 104 need a proprietary connection which allows this.

If control is transferred to the second controlling device 104 by having the second controlling device 104 create an interface to the AR which interfaces with the AR 107 on the first controlling device 103, then such an interface needs to be able to operate through the gateway devices 202, 203.

We claim:

1. A communication system including a plurality of interconnected controlling devices and a controlled device, functionality of the controlled device being associated with an abstract representation, referred to as AR, which provides an interface for controlling the controlled device, the AR for the controlled device being installed on a first controlling device from said plurality, wherein the system has migration means for selecting a second controlling device from said plurality based on a predetermined criterion and for generating a migration event, and wherein the first controlling device is arranged to transfer control over the controlled device to the second controlling device in response to the migration event.

2. A communication system according to claim 1, wherein the predetermined criterion comprises a level for the quality of a connection between the controlled device and any of the controlling devices from said plurality.

3. A communication system according to claim 1, wherein the predetermined criterion comprises a level for the availability of resources on the controlling devices from said plurality.

4. A communication system according to claim 1, wherein the first controlling device is arranged to transfer control by transferring the AR for the controlled device to the second controlling device.

5. A communication system according to claim 4, wherein the first controlling device is arranged to additionally transfer the current state of the AR to the second controlling device.

6. A communication system according to claim 1, wherein the second controlling device is arranged to receive the transferred control by creating an interface to the AR which interfaces with the AR on the first controlling device.

7. A communication system according to claim 1, wherein the first controlling device is located in a first cluster comprising devices from said plurality and the second controlling device is located in a second cluster comprising devices from said plurality, said first and second clusters being interconnected via respective gateway devices.

8. A controlling device for use in a communication system including a plurality of interconnected controlling devices and a controlled device, functionality of the controlled device being associated with an abstract representation, referred to as AR, which provides an interface for controlling the controlled device, the AR for the controlled device being installed on the controlling device from said plurality, wherein the controlling device is arranged to transfer control over the controlled device to another controlling device in response to a migration event.

9. A controlling device according to claim 8, wherein the controlling device is arranged to transfer control by transferring the AR for the controlled device to the other controlling device.

10. A controlling device according to claim 9, wherein the controlling device is arranged to additionally transfer the current state of the AR to the other controlling device.

11. A controlling device for use in a communication system including a plurality of interconnected controlling devices and a controlled device, functionality of the controlled device being associated with an abstract representation, referred to as AR, which provides an interface for controlling the controlled device, the AR for the controlled device being installed on another controlling device from said plurality, wherein the controlling device is arranged to receive control over the controlled device transferred from the other controlling device by creating an interface to the AR which interfaces with the AR on the other controlling device.

12. A controlling device for use in a communication system including a plurality of interconnected controlling devices and a controlled device, functionality of the controlled device being associated with an abstract representation, referred to as AR, which provides an interface for controlling the controlled device, the AR for the controlled device being installed on another controlling device from said plurality, wherein the controlling device has migration means for selecting another controlling device from said plurality based on a predetermined criterion and generating a migration event.

13. A controlled device for use in a communication system including a plurality of interconnected controlling devices and said controlled device, functionality of the controlled device being associated with an abstract representation, referred to as AR, which provides an interface for controlling the controlled device, the AR for the controlled device being installed on another controlling device from said plurality, wherein the controlled device has migration means for selecting another controlling device from said plurality based on a predetermined criterion and generating a migration event.

* * * * *